Patented July 21, 1925.

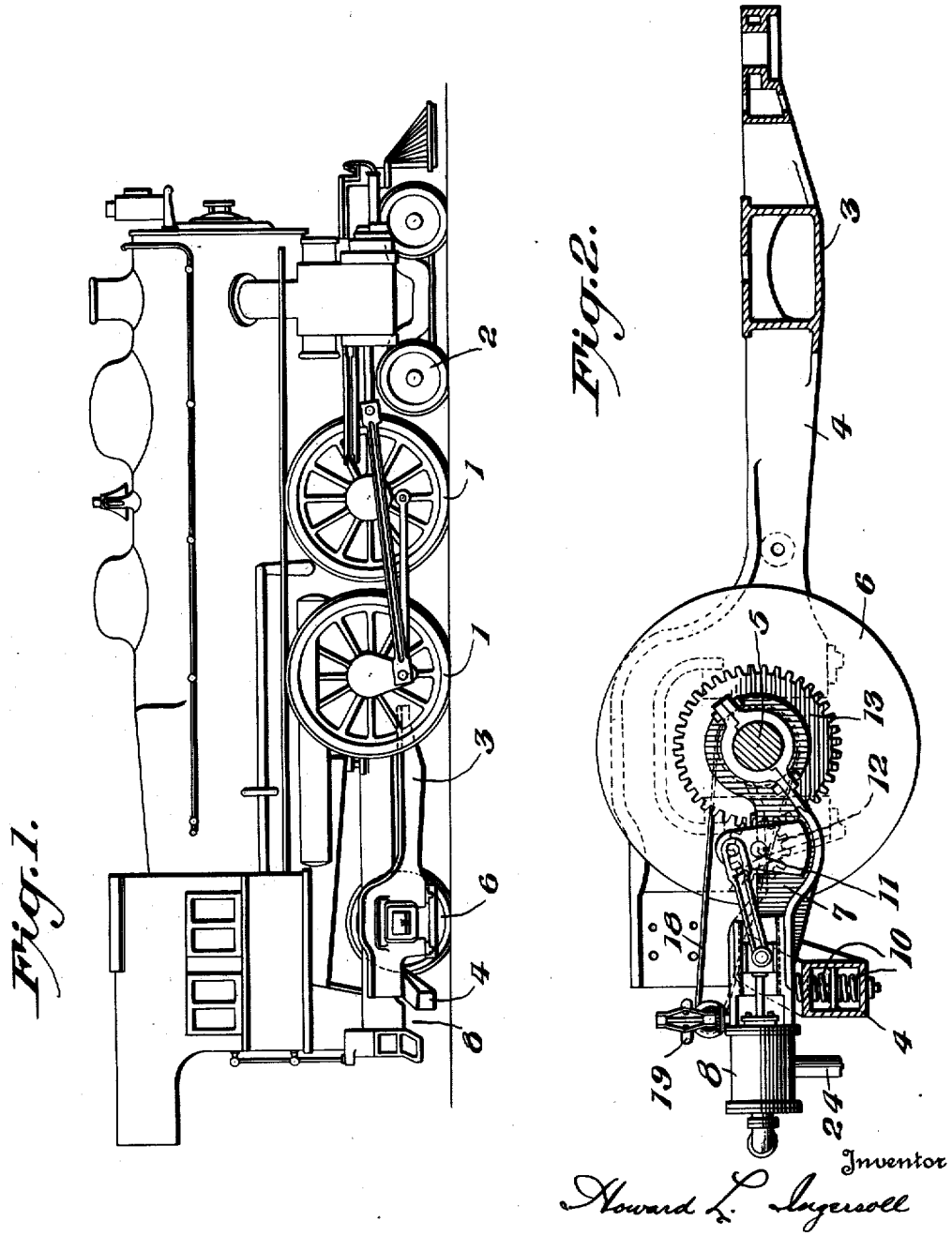

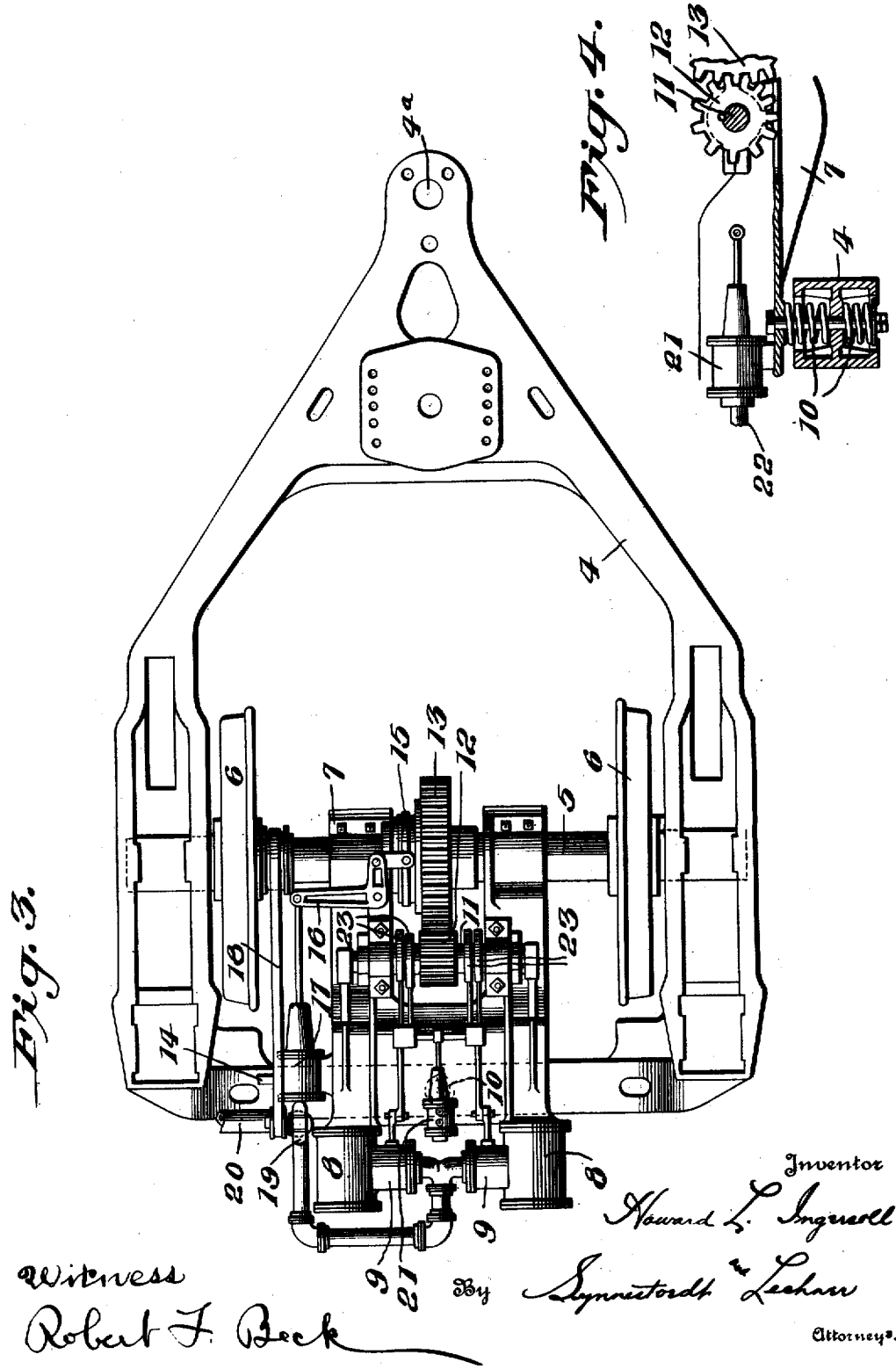

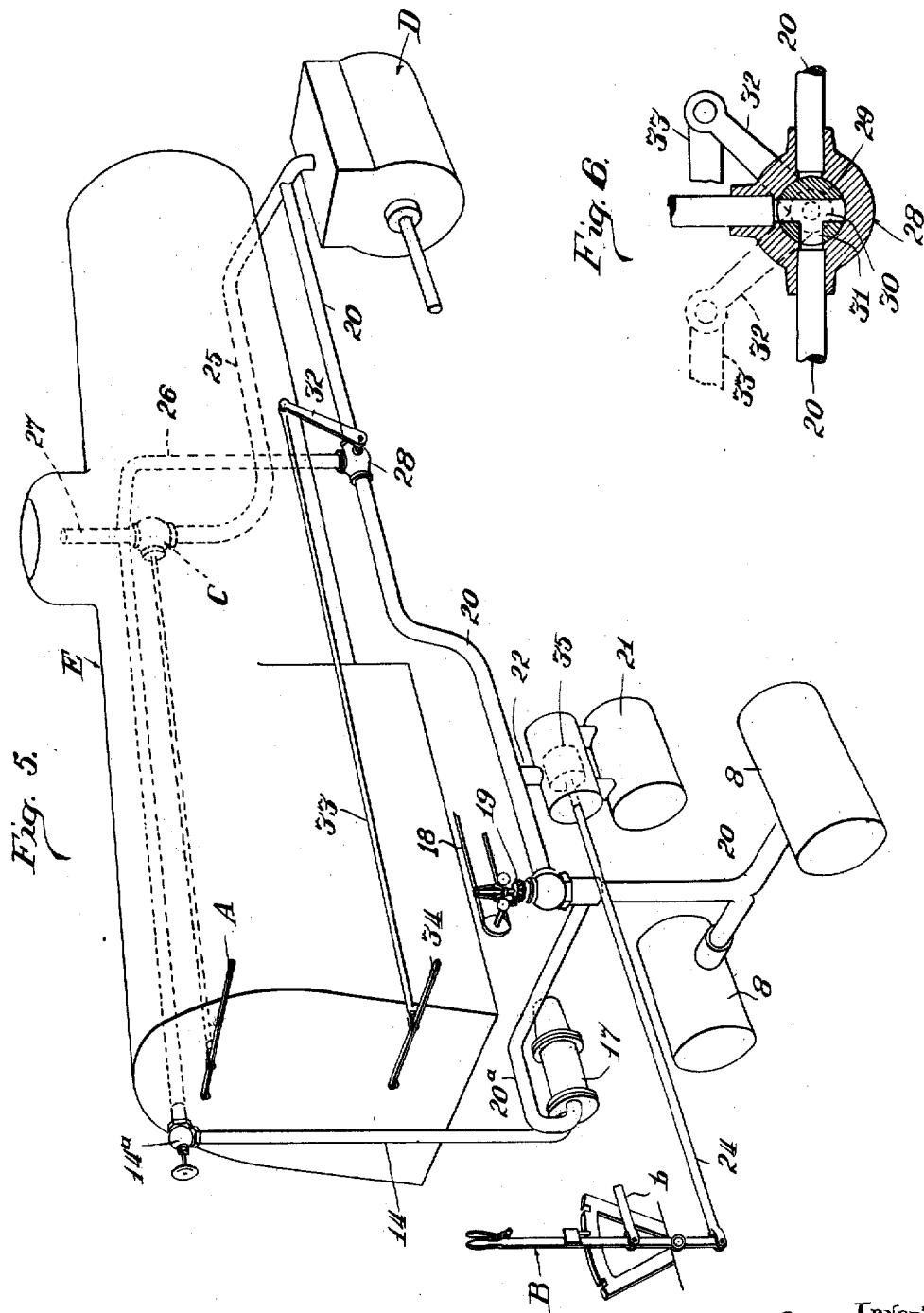

1,547,155

UNITED STATES PATENT OFFICE.

HOWARD L. INGERSOLL, OF WHITE PLAINS, NEW YORK.

BOOSTER MOTOR FOR LOCOMOTIVES.

Original application filed October 2, 1917, Serial No. 194,335. Renewed February 16, 1920, Serial No. 359,201. Patent No. 1,375,293, dated April 19, 1921. Divided and this application filed November 15, 1920. Serial No. 424,049.

*To all whom it may concern:*

Be it known that I, HOWARD L. INGERSOLL, a citizen of the United States, residing at White Plains, in the county of Westchester and State of New York, have invented certain new and useful Improvements in Booster Motors for Locomotives, of which the following is a specification.

My invention relates to an auxiliary or "booster" motor for locomotives the function of which is to aid the main driving means of the locomotive in starting and in driving the locomotive at relatively low speeds, for example, when the train is getting under way or is moving up a heavy grade; the present invention being particularly concerned with an apparatus whereby the booster motor may be controlled so as to be put into or out of action as circumstances require.

A primary object of the invention is to provide a new and improved controlling mechanism for a locomotive booster motor, the operating parts of which are moved by the pressure of steam taken from the locomotive boiler.

A further object is to provide controlling means for the booster motor which may be either subordinated to the control of the main driving means of the locomotive, so that the booster motor is put into operation automatically when the locomotive is started up, and is put out of action when the locomotive is stopped, or which may be operated to control the booster motor independently of the control of the main driving means.

A further object is to provide a governing device which, when the locomotive attains a certain speed, automatically puts the booster motor out of operation and makes its controlling mechanism ineffective; the invention contemplating, however, an arrangement whereby the booster motor may be operated, if need be, independently of the governing device.

This application is a division of my copending application filed as Serial No. 194,335, October 2, 1917, and renewed as Serial No. 359,201, February 16, 1920, (patented as No. 1,375,293, April 19, 1921).

The invention is illustrated, in a preferred embodiment, in the accompanying drawings in which—

Fig. 1 is a side elevation of a locomotive of the Atlantic type furnished with a booster motor in accordance with my invention.

Fig. 2 is a sectional view of the booster motor and the trailer truck on which it is mounted.

Fig. 3 is a plan view of the motor and truck.

Fig. 4 is a detail sectional view illustrating the connection between the motor frame and the truck frame.

Fig. 5 is a diagram illustrating the controlling apparatus for the booster, and

Fig. 6 is a sectional view of one of the valves employed in this controlling apparatus.

In the drawings, the numerals 1 designate the main driving wheels of the locomotive, 2 the leader truck and 3 the trailer truck, the latter comprising a frame 4, pivoted at 4ᵃ to the main frame of the locomotive, an axle 5 and wheels 6. The frame 7 carrying the booster motor cylinders and valve boxes 9 is journaled on axle 5 and flexibly supported at its rear end on the truck frame 4 by means of springs 10. A shaft 11, journaled on the frame 7, has fixed thereto a gear wheel 12 meshing with a gear wheel 13 on the truck axle 5. 15 is a clutch operated by a bell crank 16 for clutching gear 13 to axle 5. The bell crank 16 is actuated by a steam cylinder 17. When steam is introduced into the cylinder the piston therein is moved to rock bell crank 16 to a position which clutches gear 13 to axle 5. The clutch is released on disappearance of pressure from cylinder 17.

The locomotive boiler is indicated at E. 25 is a dry pipe leading from the boiler to the main cylinders of the locomotive, one of which is indicated at D. C is the main throttle valve of the locomotive arranged in dry pipe 25 and operated by a throttle lever A in the cab of the locomotive. 20 is a pipe leading from dry pipe 25 to the booster motor cylinders 8 and 20ᵃ a branch pipe from pipe 20 to the clutch cylinder 17. Arranged in the pipe 20 above the junction of branch pipe 20ᵃ is a centrifugal governor 19, of any desired type, which is shown as operated by a belt 18 extending around truck axle 5. 14 is a pipe provided with valve 14ª, which pipe leads from the upper end 27 of dry pipe 25 to the cylinder 17. 28 is the casing of a three-way valve 29 located in pipe 20 (Fig. 6), valve 29 being operated by a crank 32, link 33 and lever 34, the latter being located in the cab of the locomotive. 26 is a pipe leading from the upper end 27 of dry pipe 25 to valve casing 28. Valve 29 has a through port 30 and a branch port 31 so that in one position of the valve (full line position, Fig. 6) pipe 26 is in communication with the portion of pipe 20 leading to the governor 19, the other end of pipe 20 being shut off, while in another position of the valve, that indicated by the dotted line position of crank 32 (Fig. 6), pipe 26 is closed and the ends of pipe 20 put into communication with each other. The reverse lever of the locomotive is indicated at B, b indicating the link which extends to the valves of the main cylinders D. 21 is a steam cylinder provided with a piston connected with eccentrics on shaft 11 which control the booster valves in boxes 9. Steam is admitted to one end or the other of cylinder 21 from a pipe 22 leading from pipe 20 in accordance with the position of a valve 35 connected by a rod 24 to the reverse lever B. By this arrangement the booster motor is synchronized with the main driving means of the locomotive to drive the locomotive forwardly when the main driving mechanism is so operated, and to be reversed when the main driving mechanism is reversed.

Operation: Assuming that the valve 29 is turned at 90° from the position shown in Fig. 6, that is to say, to the dotted line position of crank 32, in which case pipe 26 will be closed and the ends of pipe 20 put into communication with each other through port 30, steam will flow from the dry pipe 25 through pipe 20 to the cylinders 8 of the booster motor and through branch pipe 20ª to cylinder 17. The booster motor is thus put into operation, the admission of steam to cylinder 17 moving bell crank 16 to clutch gear 13 to the truck axle 5. With valve 29 in this position the booster motor control is subordinated to the control of the main driving means of the locomotive, that is, when steam is shut off from the main cylinders D by manipulation of throttle lever A, closing throttle C, the driving connection between the booster and axle 5 is released, through release of clutch 15, and steam is shut off from the booster cylinders. Conversely, the opening of main throttle C brings about a reestablishment of the driving connection between the booster and truck axle 5 and the admission of steam to the booster cylinders.

By moving valve 29 to the position indicated by the full lines in Fig. 6, the forward end of pipe 20 is closed and pipe 26 is put into communication with the portion of pipe 20 leading to the booster motor. Steam now flows to the clutch cylinder 17 and booster cylinders 8 through pipes 26 and 20, the booster motor being now controllable through manipulation of a lever 34 independently of the control of the main driving means of the locomotive. Valve 29 may be manipulated as the throttle valve of the booster.

With either system of control above outlined, when the locomotive attains a certain speed the governing device 19 will operate to shut off steam from clutch cylinder 17 and from the booster cylinders so that the booster motor will be put out of operation and its controlling means made ineffective and will so remain during such period as the locomotive continues to move at a speed in excess of the speed at which the governor is set to operate.

In order that, if need be, the booster motor may be operated independently of the governor, in case the governor, for example, should be disabled, steam may be admitted to clutch cylinder 17 through pipe 14 and to the booster cylinders 8 through pipe 20ª and 20 by opening valve 14ª.

I claim:

1. The combination with a locomotive having main driving wheels and means for driving the same, of normally idle wheels carrying part of the weight of the locomotive, a booster motor adapted to drive said last named wheels in starting and at low speeds of the locomotive, and steam actuated mechanism for controlling the operation of the booster.

2. The combination of a locomotive having main driving wheels and means for driving the same, of normally idle wheels carrying a part of the weight of the locomotive, a steam operated booster motor adapted to drive said last named wheels in starting and at low speeds of the locomotive, and steam actuated mechanism for effecting a releasable driving connection between said booster motor and said wheels.

3. In combination with the main driving means of a locomotive, a booster motor for aiding said main driving means in starting the locomotive and propelling it at low speeds and a steam actuated mechanism for controlling the operation of the booster.

4. In combination with the main driving means of a locomotive, a booster motor for aiding said main driving means in starting the locomotive and propelling it at low speeds and a steam actuated mechanism for controlling the operation of the booster comprising a governor which shuts off steam supply to the motor and to its controlling devices when the locomotive reaches a given speed.

5. In combination with the main driving means of a locomotive, and its controlling devices, a booster motor and a steam actuated mechanism governed by the operation of the controlling devices of the main driving means for controlling the booster.

6. In combination with the main driving means of a locomotive and its controlling devices, of a booster motor, a steam actuated mechanism under control of the controlling devices of the main driving means, for governing the operation of the booster, and an independent controlling member manipulatable by the engineman the position of which conditions the control of the booster through the controlling devices of the main driving means.

7. In combination with the main driving means of a locomotive and its controlling devices, a booster motor, steam actuated mechanism for controlling the operation of the booster means adapted to be set to either subordinate the booster control to the control of the main driving means or to allow the booster to be independently governed at the will of the engineman.

8. In combination with the main driving means of a steam propelled locomotive and its controlling devices, a booster motor and means whereby said booster motor may be controlled either through manipulation of the controlling devices of the main driving means or independently thereof.

9. In combination with the main driving means of a steam propelled locomotive and its controlling devices, a steam actuated booster motor and means whereby said booster motor may be controlled either through manipulation of the controlling devices of the main driving means or independently thereof.

10. In combination with the main driving means of a steam propelled locomotive and its controlling devices, a booster motor, means whereby said booster motor may be controlled either through manipulation of the controlling devices of the main driving means or independently thereof, and a governing device which puts the booster out of operation automatically when the locomotive attains a given speed.

11. In combination with the main driving means of a steam propelled locomotive and its controlling devices, a booster motor having a releasable driving connection with a normally idle wheel of a locomotive and means whereby said driving connection may be established and released and motive power supplied to and cut off from the booster either through manipulation of the controlling devices of the main driving means or independently thereof.

12. In combination with the main driving means of a steam propelled locomotive and its controlling devices, a booster motor having a releasable driving connection with a normally idle wheel of the locomotive, means whereby said driving connection may be established and released and motive power supplied to and cut off from the booster either through manipulation of the controlling devices of the main driving means or independently thereof and a governing device which effects the release of said driving connection and shuts off motive power from the booster motor when the locomotive attains a given speed.

13. In combination with the main driving means of a steam propelled locomotive and its controlling devices, a booster motor having a releasable driving connection with a normally idle wheel of a locomotive and steam actuated means whereby said driving connection may be established and released and motive power supplied to and cut off from the booster either through manipulation of the controlling devices of the main driving means or independently thereof.

14. In combinatian with the main driving means of a steam propelled locomotive and its controlling devices a booster motor, means for supplying the same with motive power and means for operatively connecting the booster motor with the locomotive and disconnecting the same therefrom which may be controlled either through operation of said first named means or independently thereof.

15. In combination with the main driving means of a steam propelled locomotive and its throttle lever, a booster motor, the operation of which is controllable by said throttle lever or independently thereof at the will of the engine man.

16. In combination with the main driving means of a steam propelled locomotive and its throttle lever, a booster motor and means controllable by said throttle lever for operatively connecting the booster motor with and disconnecting the same from the locomotive.

17. In combination with the main driving means of a steam propelled locomotive and its throttle lever, a booster motor, means controllable by said throttle lever when opened and closed for operatively connecting the booster motor with the locomotive and admitting steam to the booster motor and for disconnecting the booster motor from the locomotive and shutting off steam therefrom and a governing device whereby the booster motor is put out of operation when the locomotive attains a given speed.

18. In combination with the main driving means of a steam propelled locomotive and its throttle lever, a booster motor and means controllable by said throttle lever for operatively connecting the booster motor with and disconnecting the same from the locomotive and a governing device whereby the booster motor is put out of operation when the locomotive attains a given speed.

19. In combination with the main driving means of a steam propelled locomotive and its throttle lever, a steam actuated booster motor and a steam actuated device controlable by said throttle lever for operatively connecting the booster motor with the locomotive.

20. In combination with the main driving means of a steam propelled locomotive and its throttle lever, a steam actuated booster motor, a steam actuated device controllable by said throttle lever for operatively connecting the booster motor with the locomotive and a governing device which shuts off steam from said steam actuated device when the locomotive attains a given speed.

21. In combination with the main driving means of a steam propelled locomotive and its throttle lever, a steam actuated booster motor and a steam actuated device controllable by said throttle lever for operatively connecting the booster motor with the locomotive and admitting steam to the booster motor.

22. In combination with the main driving means of a steam propelled locomotive and its throttle lever, a steam actuated booster motor, a steam actuated device controllable by said throttle lever for operatively connecting the booster motor with the locomotive and admitting steam to the booster motor and a governing device which shuts off steam from the steam actuated device and from the booster motor when the locomotive attains a given speed.

23. In combination with the main driving means of a steam propelled locomotive and its controlling devices, a steam actuated booster motor, a steam actuated device for operatively connecting the booster motor with the locomotive and means controllable by said controlling devices for governing the flow of steam to said booster motor and to said steam actuated device.

24. In combination with the main driving means of a steam propelled locomotive and its controlling devices, a steam actuated booster motor, a steam actuated device for operatively connecting the booster motor with the locomotive and means controllable by said controlling devices or independently thereof for governing the flow of steam to said booster motor and to said steam actuated device.

25. In combination with the main driving means of a steam propelled locomotive and its controlling devices, a steam actuated booster motor, a steam actuated device for operatively connecting the booster motor with the locomotive, means controllable by said controlling devices for governing the flow of steam to the booster motor and to said steam actuated device and a governing device for shutting off steam from the booster motor and said steam actuated device when the locomotive attains a given speed.

26. In combination with the main driving means of a steam propelled locomotive and its throttle lever and reverse lever, a steam actuated booster motor, the valves of which are controlled by said reverse lever and means controllable by said throttle lever for operatively connecting said booster motor with and disconnecting it from the locomotive.

27. In combination with the main driving means of a locomotive, a booster motor for said locomotive, a governing device for putting the booster motor out of operation when the locomotive attains a certain speed, and means whereby the booster motor may be controlled independently of said governing device.

28. In combination with the main driving means of a locomotive, a booster motor for said locomotive, means for controlling the operation of the booster motor, a governing device for putting the booster motor out of operation and making said controlling means ineffective when the locomotive attains a certain speed, and means whereby the booster motor may be controlled independently of the aforesaid controlling means and governing device.

29. In combination with the main driving means of a locomotive, a booster motor for said locomotive having a releasable driving connection with a normally idle axle thereon, controlling means for establishing and releasing said driving connection and admitting and shutting off motive power to the booster, a governing device which makes said controlling means ineffective when the locomotive attains a given speed, and means whereby the booster motor may be operated independently of the aforesaid controlling means and governing device.

30. In combination with the main driving means of a locomotive and its controlling device, a booster motor for said locomotive, controlling means for the booster motor which may be set so that the booster is controlled by the controlling devices of the main driving means or so that the booster motor may be controlled independently of the control of the main driving means, a governing device which puts the booster motor out of operation and makes its controlling means ineffective when the locomotive attains a certain speed, and means for controlling the booster motor independently of said first named controlling means and said governing device.

31. The method of aiding a locomotive engine in the propulsion of a train, which consists in utilizing the steam supply of the main engine of the locomotive for operating an auxiliary propulsion unit and directly effecting an operative driving connection between said auxiliary propulsion unit and a load bearing axle of the train through the medium of the pressure influence of the steam.

32. In the propulsion of vehicles having primary and auxiliary propulsion mechanisms, the method which consists in automatically entraining the auxiliary mechanism with a load bearing axle and simultaneously rendering said mechanisms effective or ineffective by means of a common motivating agent and in controlling the supply of said agent whereby the auxiliary propulsion mechanism may be operated at maximum power output regardless of variations in the power output of the primary propulsion mechanism.

33. The method of controlling the operation of an auxiliary propulsion unit for locomotives which consists in connecting the power supply of the locomotive to said propulsion unit independently of the steam control means for the locomotive engine and in utilizing the pressure influence of the steam to entrain the auxiliary unit with an axle and controlling the supply of steam from the locomotive boiler to the main engine and to said auxiliary propulsion unit solely through the medium of the locomotive throttle valve and likewise independently of other steam controlling devices for the locomotive.

34. In combination with an auxiliary propulsion unit for locomotives and entraining mechanism therefor, means controlled and operated solely by the pressure influence of steam from the locomotive for effecting entrainment of said mechanism with an axle to be driven thereby.

35. In combination with a steam locomotive, its main driving means and controlling devices therefor, an auxiliary propulsion unit for aiding the main driving means in propelling the locomotive and normally disconnected from an axle to be driven thereby, and means automatically actuated solely by steam pressure upon opening the usual locomotive throttle valve to effectively entrain the auxiliary propulsion unit with said axle.

36. In combination with the main driving means of a steam propelled locomotive, an auxiliary propulsion unit normally disentrained from an axle to be positively driven thereby, steam supply connections between said propulsion unit and the locomotive and means operable independently of the steam controlling devices for the main engine of the locomotive governing the supply of steam to said propulsion unit, said propulsion unit including means initially actuated under the pressure influence of the steam to effect the entrainment of said propulsion unit with the axle to be driven thereby.

In testimony whereof, I have hereunto signed my name.

HOWARD L. INGERSOLL.

effecting an operative driving connection between said auxiliary propulsion unit and a load bearing axle of the train through the medium of the pressure influence of the steam.

32. In the propulsion of vehicles having primary and auxiliary propulsion mechanisms, the method which consists in automatically entraining the auxiliary mechanism with a load bearing axle and simultaneously rendering said mechanisms effective or ineffective by means of a common motivating agent and in controlling the supply of said agent whereby the auxiliary propulsion mechanism may be operated at maximum power output regardless of variations in the power output of the primary propulsion mechanism.

33. The method of controlling the operation of an auxiliary propulsion unit for locomotives which consists in connecting the power supply of the locomotive to said propulsion unit independently of the steam control means for the locomotive engine and in utilizing the pressure influence of the steam to entrain the auxiliary unit with an axle and controlling the supply of steam from the locomotive boiler to the main engine and to said auxiliary propulsion unit solely through the medium of the locomotive throttle valve and likewise independently of other steam controlling devices for the locomotive.

34. In combination with an auxiliary propulsion unit for locomotives and entraining mechanism therefor, means controlled and operated solely by the pressure influence of steam from the locomotive for effecting entrainment of said mechanism with an axle to be driven thereby.

35. In combination with a steam locomotive, its main driving means and controlling devices therefor, an auxiliary propulsion unit for aiding the main driving means in propelling the locomotive and normally disconnected from an axle to be driven thereby, and means automatically actuated solely by steam pressure upon opening the usual locomotive throttle valve to effectively entrain the auxiliary propulsion unit with said axle.

36. In combination with the main driving means of a steam propelled locomotive, an auxiliary propulsion unit normally disentrained from an axle to be positively driven thereby, steam supply connections between said propulsion unit and the locomotive and means operable independently of the steam controlling devices for the main engine of the locomotive governing the supply of steam to said propulsion unit, said propulsion unit including means initially actuated under the pressure influence of the steam to effect the entrainment of said propulsion unit with the axle to be driven thereby.

In testimony whereof, I have hereunto signed my name.

HOWARD L. INGERSOLL.

DISCLAIMER.

1,547,155.—*Howard L. Ingersoll*, White Plains, N. Y. BOOSTER MOTOR FOR LOCOMOTIVES. Patent dated July 21, 1925. Disclaimer filed August 29, 1928, by the patentee and assignees (not recorded), *Locomotive Booster Company* and *Franklin Railway Supply Company*.

Hereby enter this disclaimer to that part of the claims in said specification which are in the following words, to wit:

"1. The combination with a locomotive having main driving wheels and means for driving the same, of normally idle wheels carrying part of the weight of the locomotive, a booster motor adapted to drive said last named wheels in starting and at low speeds of the locomotive, and steam actuated mechanism for controlling the operation of the booster."

"3. In combination with the main driving means of a locomotive, a booster motor for aiding said main driving means in starting the locomotive and propelling it at low speeds and a steam actuated mechanism for controlling the operation of the booster."

as not patentable in view of the disclosure and claims in said patentee's prior Patent No. 1,339,395; and to that part of the claims in said specification which are in the following words, to wit:

"31. The method of aiding a locomotive engine in the propulsion of a train, which consists in utilizing the steam supply of the main engine of the locomotive for operating an auxiliary propulsion unit and directly effecting an operative driving connection between said auxiliary propulsion unit and a load bearing axle of the train through the medium of the pressure influence of the steam."

as covering a method which is nothing more than the statement of a result which may be accomplished by steam actuation of the mechanical devices which are disclosed as being capable of performing it.

[*Official Gazette September 25, 1928.*]

DISCLAIMER.

1,547,155.—*Howard L. Ingersoll*, White Plains, N. Y. BOOSTER MOTOR FOR LOCOMOTIVES. Patent dated July 21, 1925. Disclaimer filed August 29, 1928, by the patentee and assignees (not recorded), *Locomotive Booster Company* and *Franklin Railway Supply Company*.

Hereby enter this disclaimer to that part of the claims in said specification which are in the following words, to wit:

"1. The combination with a locomotive having main driving wheels and means for driving the same, of normally idle wheels carrying part of the weight of the locomotive, a booster motor adapted to drive said last named wheels in starting and at low speeds of the locomotive, and steam actuated mechanism for controlling the operation of the booster."

"3. In combination with the main driving means of a locomotive, a booster motor for aiding said main driving means in starting the locomotive and propelling it at low speeds and a steam actuated mechanism for controlling the operation of the booster."

as not patentable in view of the disclosure and claims in said patentee's prior Patent No. 1,339,395; and to that part of the claims in said specification which are in the following words, to wit:

"31. The method of aiding a locomotive engine in the propulsion of a train, which consists in utilizing the steam supply of the main engine of the locomotive for operating an auxiliary propulsion unit and directly effecting an operative driving connection between said auxiliary propulsion unit and a load bearing axle of the train through the medium of the pressure influence of the steam."

as covering a method which is nothing more than the statement of a result which may be accomplished by steam actuation of the mechanical devices which are disclosed as being capable of performing it.

[*Official Gazette September 25, 1928.*]